No. 663,325. Patented Dec. 4, 1900.
J. BLAMIRE.
CHUCK.
(Application filed Feb. 10, 1900.)
(No Model.)
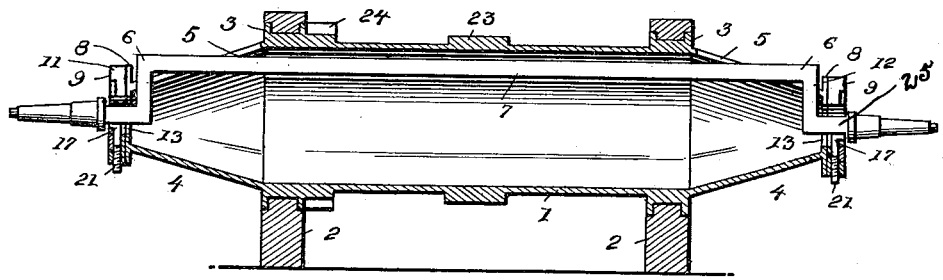
Fig. 1.
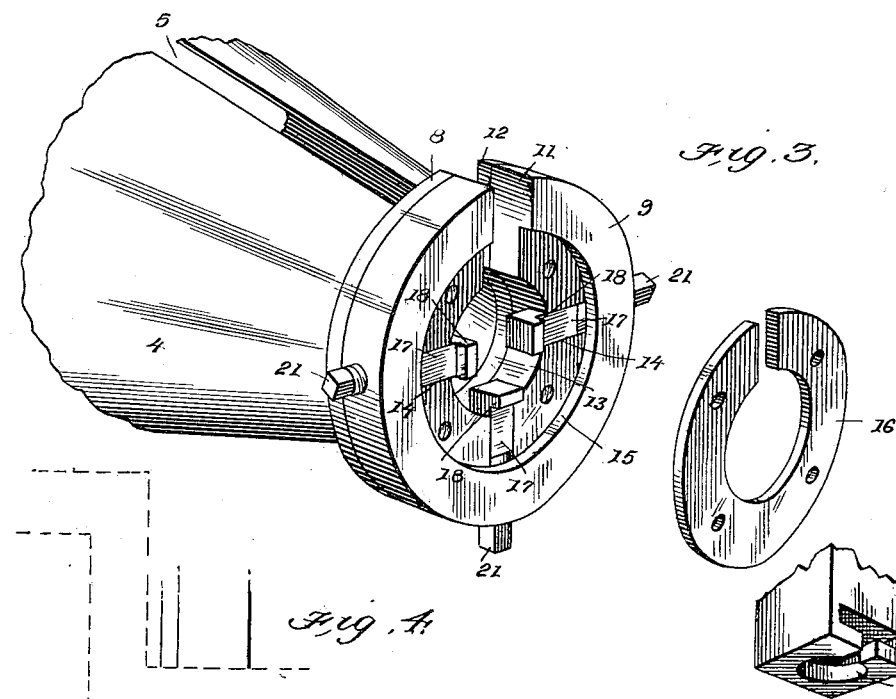
Fig. 3.
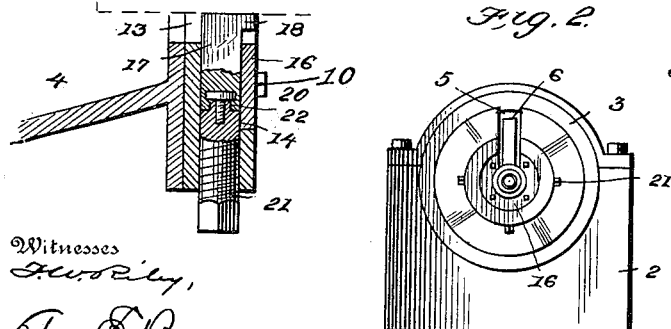
Fig. 4.
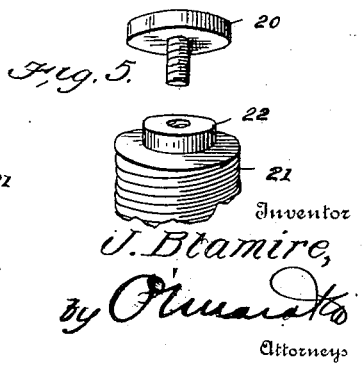
Fig. 2.
Fig. 5.
Witnesses
Inventor
J. Blamire,
by
Attorneys
THE NORRIS PETERS CO., PHOTO-LITHO., WASHINGTON, D. C.

UNITED STATES PATENT OFFICE.

JAMES BLAMIRE, OF PARSONS, PENNSYLVANIA.

CHUCK.

SPECIFICATION forming part of Letters Patent No. 663,325, dated December 4, 1900.

Application filed February 10, 1900. Serial No. 4,784. (No model.)

*To all whom it may concern:*

Be it known that I, JAMES BLAMIRE, a citizen of the United States, residing at Parsons, in the county of Luzerne and State of Pennsylvania, have invented a new and useful Chuck and Enlarged Sleeve, of which the following is a specification.

My invention relates to chucks and sleeves for holding cranked axles in a lathe for turning the arms; and it has for its object to produce a sleeve and chuck into which the axle can be quickly inserted and secured and one which can be readily adapted for axles of different lengths. I accomplish this object by the construction shown in the accompanying drawings, in which the same reference-numerals indicate corresponding parts in each of the views in which they occur, and in which—

Figure 1 is a longitudinal sectional view of my improved sleeve and chuck with an axle in position. Fig. 2 is an end view of the same. Fig. 3 is a perspective detail view of one end of my improved chuck and sleeve, the face-plate of the chuck being removed and placed at a short distance in front of the same. Fig. 4 is a broken sectional detail view, and Fig. 5 is a broken perspective view of parts of the jaw of the chuck separate.

Referring more particularly to the drawings, 1 indicates a sleeve, which is suitably mounted in bearings 2 by means of grooved bands or collars 3 near its ends. Each end of the sleeve is made conical, as shown at 4, and slotted longitudinally, as shown at 5, for the reception of the crank end 6 of the bed 7 or central portion of the axle, as shown in Fig. 1. Each end is further provided with a flange 8, to which the chuck 9 is secured in any suitable manner, as by means of bolts 10. The chuck is preferably of the same size as the flange and is provided with a radial slot 11, that registers with a corresponding slot 12 in the flange. Arranged at right angles to each other and extending from the central opening 13 in the chuck are three perforations 14, the outer ends of which are screw-threaded and the inner portions are angular in cross-section. The face of the chuck is recessed to the slotted portions of the openings in the chuck, as shown at 15, and the removable plate 16 is fitted therein. A longitudinal sliding jaw 17 is seated in each of the slotted portions of the perforations 14, the inner end of each of which is provided with a head 18, and the outer end is provided with a slotted recess 19. Seated in said recess is a screw 20, the stem of which projects through the longitudinal opening of the recess and enters the end of an adjusting-screw 21, the inner end of which is reduced, as shown at 22, to fit within the recess in the jaw 17. The outer end of said adjusting-screw is squared for the reception of a wrench or other means for rotating it in the usual manner.

The sleeve 1 may be rotated by means of a collar 23 upon its central portion for the reception of a driving-belt, or one of the collars 3 may be extended inwardly and provided with teeth 24, which are engaged by the teeth of a suitable gear-wheel, the belt and gear-wheel not being shown, as they form no part of my invention.

In operating my improved sleeve and chuck the axle is inserted longitudinally from one end until the arm portion 25 projects beyond the chuck at the opposite end of the sleeve. The jaws 17 of the chuck are then forced inward until they engage with the portion of the axle to the rear of the arm and hold it perfectly rigid, with the axis of the arm coinciding with the axis of the sleeve and chuck. The opposite end of the axle will project from the other end of the sleeve and can be steadied by means of the jaws in the chuck at that end. After the axle has been thus secured within the sleeve and chuck the sleeve is rotated and the arm is turned down and screw-threaded in the usual manner, the mechanism for performing this operation not being shown, as it forms no part of my invention. After one end of the axle has been thus treated the axle is removed from the sleeve, turned end for end, and reinserted and secured and operated upon as before.

By constructing the chuck and sleeve as above described it is evident that the axle can be bent and all of the rough work upon it performed before the arm is turned down for the reception of the wheel, thus permitting of the finest work being performed last instead of requiring it to be done first, as is the case with machines in which the axle is turned before it is bent or cranked.

If desired, the flange at the end of the sleeve can be formed of such thickness that it can be utilized for the chuck, and thereby avoid the necessity of forming the chuck separate and securing it to the flange. I also reserve to myself the right to make such other changes and alterations as will come within the scope of my invention.

Having thus fully described my invention, what I claim as new, and desire to secure by Letters Patent of the United States, is—

1. In a machine for turning cranked axles, the combination with a cylindrical sleeve, each end of which is conical and slotted longitudinally, a slotted chuck upon each end provided with radially-located jaws, the inner portion of each jaw being angular in cross-section and the outer portion being cylindrical and screw-threaded and means for rotating said sleeve, substantially as described.

2. In a machine for turning cranked axles, the combination, with a cylindrical sleeve, each end of which is conical and slotted longitudinally, of a slotted chuck on each end, provided with radially-located jaws, the inner portion of each jaw being angular in cross-section and having its inner end provided with a head and its outer end provided with a slotted recess, and the outer end of the jaw being cylindrical and screw-threaded, a screw in the recess in the inner portion of the jaw, the stem of which engages with the inner end of the outer portion of the jaw, and means for rotating the sleeve, substantially as described.

JAMES BLAMIRE.

Witnesses:
W. J. GEEN,
JOHN HALL.